(12) United States Patent
Glaesser

(10) Patent No.: US 7,392,110 B2
(45) Date of Patent: Jun. 24, 2008

(54) METHOD AND DEVICE FOR MILLING FREEFORM SURFACES

(75) Inventor: Arndt Glaesser, Dachau (DE)

(73) Assignee: MTU Aero Engines GmbH, Munich (DE)

(*) Notice: Subject to any disclaimer, the term of this patent is extended or adjusted under 35 U.S.C. 154(b) by 0 days.

(21) Appl. No.: 10/564,209

(22) PCT Filed: Jul. 2, 2004

(86) PCT No.: PCT/DE2004/001412

§ 371 (c)(1),
(2), (4) Date: Jan. 9, 2006

(87) PCT Pub. No.: WO2005/006093

PCT Pub. Date: Jan. 20, 2005

(65) Prior Publication Data

US 2006/0206234 A1    Sep. 14, 2006

(30) Foreign Application Priority Data

Jul. 8, 2003    (DE) .................... 103 30 846

(51) Int. Cl.
*G06F 19/00*    (2006.01)
(52) U.S. Cl. ..................... 700/187; 700/189
(58) Field of Classification Search ........... 700/187, 700/189

See application file for complete search history.

(56) References Cited

U.S. PATENT DOCUMENTS

| 5,227,978 A | 7/1993 | Kato |
| 5,726,896 A | 3/1998 | Jia et al. |
| 5,815,401 A | 9/1998 | Otsuki et al. |

FOREIGN PATENT DOCUMENTS

| DE | 43 10 126 | 10/1994 |
| DE | 690 21 795 | 5/1996 |
| EP | 0 406 784 | 1/1991 |
| EP | 0 706 103 | 4/1996 |
| EP | 1 235 126 | 8/2002 |

OTHER PUBLICATIONS

R.V. Fleisig et al. "A constant feed and reduced angular acceleration interpolation algorithm for multi-axis machining", Computer-Aided Design, Elsevier Publishers BV, Barking, GB, vol. 33, No. 1, pp. 1-15, Jan. 2001.

*Primary Examiner*—Ryan A Jarrett
(74) *Attorney, Agent, or Firm*—W. F. Fasse; W. G. Fasse

(57) ABSTRACT

A workpiece is milled by a tool of a milling machine to form a desired freeform surface. For this purpose, the tool is moved relative to the workpiece along at least one tool path defined via support points. The support points of the or each tool path are defined either in workpiece coordinates or in machine coordinates. For each tool path, at least one spline is produced in connection with the support points. The or each spline is output to a control arrangement of the milling machine, which controls the motion of the tool along the or each tool path on the basis of the or each corresponding spline.

6 Claims, 2 Drawing Sheets

METHOD AND DEVICE FOR MILLING FREEFORM SURFACES

TITLE OF THE INVENTION

Method and Device for milling freeform Surfaces

FIELD OF THE INVENTION

The invention relates to a method for the milling of freeform surfaces and to an apparatus for the milling of freeform surfaces using at least one spline to define the tool path.

BACKGROUND INFORMATION

The present invention relates to the field of milling technology, especially the HSC milling (High Speed Cutting milling), which is also designated as HPC milling (High Performance Cutting milling).

In the milling of freeform surfaces, a tool, a so-called miller, is moved relative to the workpiece. The motion of the tool relative to the workpiece is described by tool paths or milling paths. According to the prior art, such tool paths or milling paths are defined or programmed via support points or check points or way points. In order to ensure the best possible quality of the freeform surface to be milled, the spacing distance between the individual support points must be as small as possible. With a small spacing distance of the support points, the number of the support points per milling path is large. The greater the number of the support points, the greater is also the data volume to be processed by a control arrangement of the milling machine. The greater the data volume, accordingly the greater are the demands on the processing speed of the control arrangement of the milling machine. If, namely, the processing speed of the control arrangement is limited, then the case can certainly arise, that with a too-large number of the support points and therewith a too-high data quantity that is to be processed, the control arrangement of the milling machine can no longer process the arising data quantity in such a time window so that a continuous motion of the milling tool is ensured. In this case, the motion of the milling tool relative to the workpiece proceeds in a jerky or jump-like manner. This must be avoided for quality reasons. However, the larger that the spacing distance of the support points is selected, the more faceted the freeform surface that is to be milled becomes. Therefore quality problems arise also with a reduction of the support point number and thus with an increase of the support point spacing distance.

SUMMARY OF THE INVENTION

Starting from this point, the underlying problem on which the present invention is based, is to provide a novel method for the milling of freeform surfaces as well as a corresponding apparatus.

This problem is solved in that the above initially mentioned method for the milling of freeform surfaces is further developed by the features of the present invention dieclosed herein.

According to the invention, the support points or control points of the or each tool path are defined either in workpiece coordinates or in machine coordinates. Thereafter, at least one spline is produced or generated as a function of the support points for each tool path. The or each spline is output to a control arrangement of the milling machine, whereby the control arrangement controls the motion of the tool along the or each tool path on the basis of the or each spline.

Through the present invention, the data volume to be processed by the control arrangement of the milling machine is also reduced even when a small support point spacing distance and therewith a high number of support points is selected in the programming of the or each tool path. Namely, splines are laid through the support points. The number of the splines corresponds to the number of coordinates per support point. As splines comprise an always-continuous course or progression, a quality improvement also arises for the freeform surface that is to be milled.

BRIEF DESCRIPTION OF THE DRAWINGS

Example embodiments of the invention, without being limited hereto, are explained in further detail in connection with the drawing. In the drawing.

DETAILED DESCRIPTION OF EXAMPLE EMBODIMENTS OF THE INVENTION

In the following, the present invention will be explained in greater detail with reference to the figures. Before the details of the inventive method as well as the inventive apparatus will be explained, however, in the following a few terms will be defined, to which reference will be made later.

In the milling machining or processing of a workpiece that is to be machined, a desired three-dimensional geometry is to be established on the surface of the workpiece. This desired three-dimensional geometry on the surface of the workpiece is also designated or referred to as a freeform surface.

The milling machining or processing of a workpiece for the formation of a defined three-dimensional freeform surface takes place with the aid of a so-called 5-axis milling. In the 5-axis milling, a tool, a so-called miller, can be moved in five axes relative to the workpiece that is to be machined. Three axes serve for the linear relative motion of the tool relative to the workpiece, so that each point in space can be reached. In addition to this linear motion along the so-called linear axes, the tool is also movable about a pivot axis as well as a tilt axis for the realization of undercuts. Rotational motions of the tool are made possible along the pivot axis as well as the tilt axis. Hereby it is possible, that all points in space can be reached without collision. The pivot axis as well as the tilt axis are often generally also designated as round or circular axes.

For the machining of the workpiece, the tool or the miller is moved relative to the workpiece. The motion of the tool or miller relative to the workpiece is described by tool paths or milling paths. The tool paths or milling paths describe the position of a tool tip or a tool reference point relative to the workpiece. The tool paths are defined in a CAD/CAM system in the form of support points or control points or way points.

Beginning from the tool tip or from the tool reference point, a vector extends along a tool axis or a tool shaft of the tool or miller. This vector along the tool axis beginning from the tool tip in the direction of the tool shaft is referred to as a tool vector.

Figure 1:
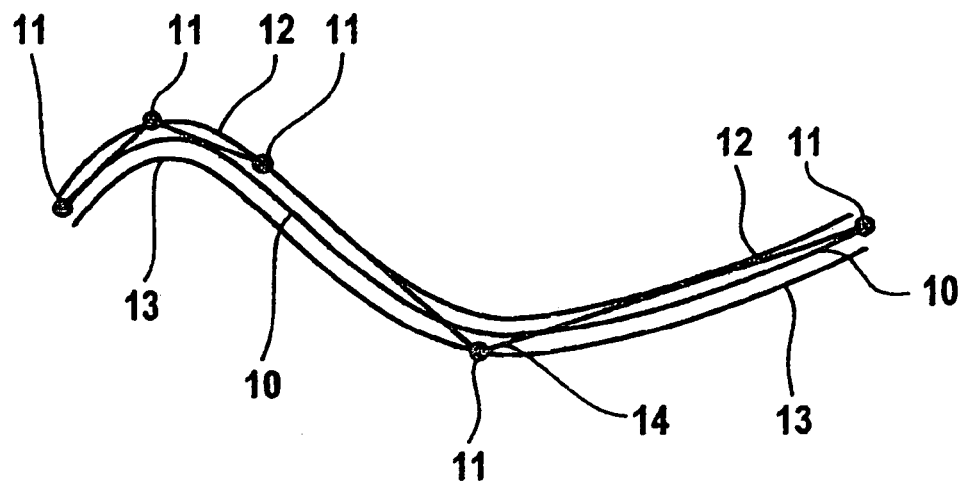
FIG. 1 shows a strongly schematized illustration of a tool path defined via support points in the sense of the prior art.

FIG. 1 shows, strongly schematized, the manner of proceeding in the programming of tool paths or milling paths in the sense of the prior art. Thus, FIG. 1 shows a contour 10 to be milled, of a freeform surface or of a workpiece. In order to produce this freeform surface or the contour 10, a miller must be moved relative to the workpiece. The tool path of the miller is defined via support points 11, whereby the support points 11 lie within tolerance limits 12, 13 for the contour 10. According to the prior art, the support points 11 are defined in a programming arrangement embodied as a CAD/CAM system. According to the prior art, the CAD/CAM system outputs the tool path or milling path 14, which is formed by a linear connection between neighboring support points 11, in the form of linear records or data sets. These linear records are then further processed according to the prior art by a control arrangement of a milling machine.

Figure 2:
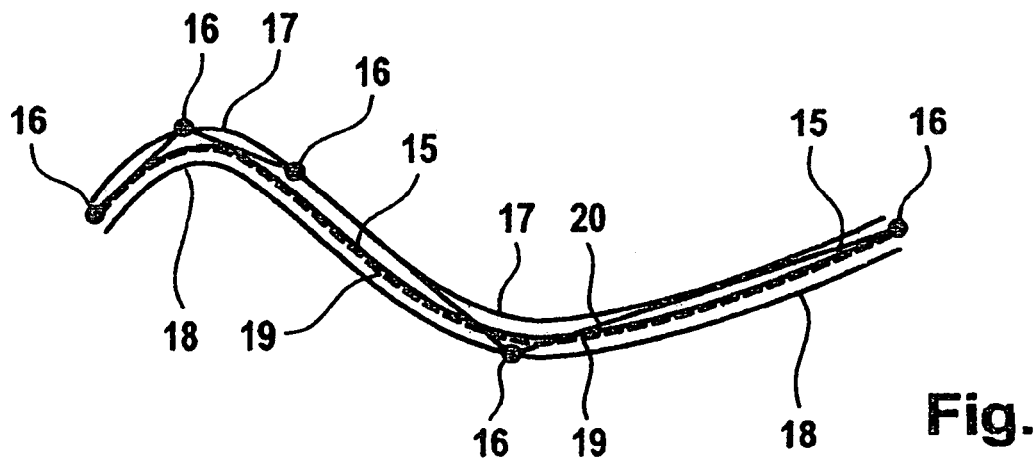
FIG. 2 shows a strongly schematized illustration of a tool path defined via support points together with a spline laid along the support points in the sense of the invention.

FIG. 2 elucidates the inventive method for the milling of freeform surfaces. FIG. 2 thus once again shows a contour 15 of a freeform surface to be milled. In the sense of the invention, support points 16 for the tool path are now defined or programmed, whereby the support points are defined either in workpiece coordinates or in machine coordinates. In that regard, the support points 16 are once again defined within tolerance limits 17, 18 for the contour 15 of the freeform surface to be milled. In the sense of the invention, at least one spline 19 is generated dependent on the support points 16 for the tool path. The spline 19 is illustrated with a dashed line in FIG. 2. From FIG. 2 it follows directly that the spline 19 has an overall continuous course or progression, and thus comprises absolutely no discontinuity points, in contrast to a linear connection 20 between the individual support points 16. The or each spline 19 is then output to a control arrangement of the milling machine. The motion of the tool or miller along the or each tool path is controlled dependent on the or each spline.

It lies within the sense or scope of the present invention, to define the support points 16 for the or each tool path either in workpiece coordinates or in machine coordinates. If the definition of the support points takes place in workpiece coordinates, then six coordinates are specified or fixed for each support point. On the other hand, if the definition of the support points 16 takes place in machine coordinates, then five coordinates are defined for each support point.

For all coordinates of the support points, a spline is now respectively specified or fixed for a tool path that has been programmed via support points 16 in a CAD/CAM apparatus. In the case in which the support points are defined in workpiece coordinates, a total of six splines are produced for each tool path, because six coordinates are necessary per support point for a definition of the support points in workpiece coordinates. In the case in which the support points are defined in machine coordinates, a total of five splines are produced for each tool path.

The production or generation of the splines takes place via an interpolation method that is known from the numerical mathematics. Reference is made to the relevant literature regarding the mathematical details. For the production or generation of the five or six splines per tool path it is significant that the interpolation parameters for all splines of the respective tool path are selected to be equal or the same. Accordingly, all five or six splines of a tool path are defined either over the path length or the milling time. If the interpolation parameters are the same for all splines, then the splines of a respective tool path are synchronized.

Figure 3:
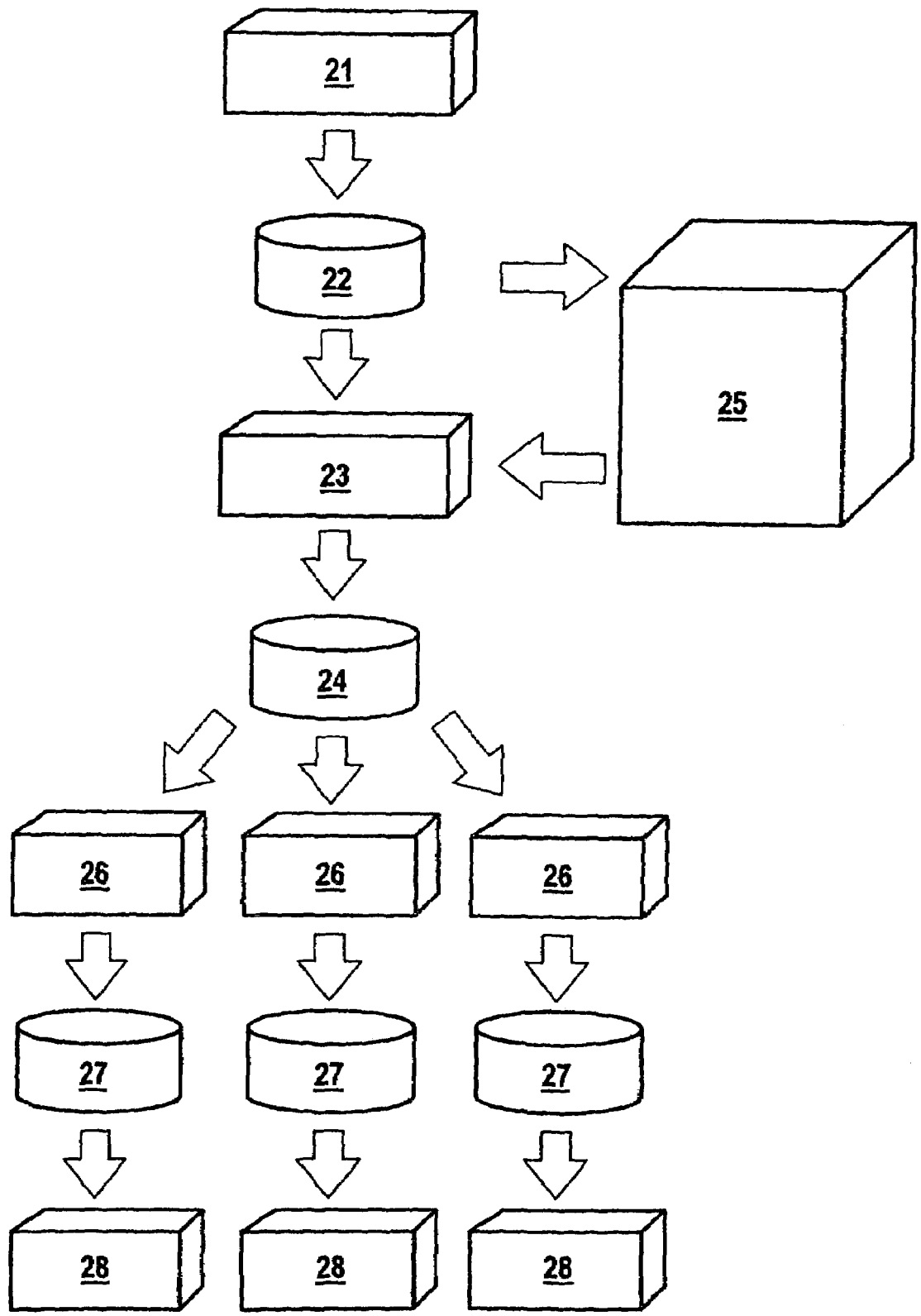
FIG. 3 shows a strongly schematized block circuit diagram of an inventive apparatus for the milling of freeform surfaces.

FIG. 3 shows a strongly schematized block circuit diagram of an apparatus according to the invention for the milling of freeform surfaces. In the illustrated example embodiment, the apparatus according to the invention encompasses a programming arrangement 21 for the programming of at least one tool path or milling path of a milling tool via support points. The support points are programmed either in machine coordinates or in workpiece coordinates as already mentioned above.

The first programming arrangement 21 is a CAD/CAM system. The CAD/CAM system produces or generates a so-called APT (Automatic Programming Tool) file 22, whereby an APT processor 23 produces from the APT file 22 a machine-independent control file 24 for the milling machining of the workpiece. With the aid of so-called post-processors 26, so-called control or NC files 27, which are machine-dependent, are produced from the machine-independent control file 24. These control or NC files 27 are provided to control arrangements 28, which control the individual motion axes of the milling machine or NC machine.

Means 25 are allocated to the programming arrangement 21 in order to produce at least one spline for each tool path dependent on the support points. The production or generation of the splines for the tool paths takes place in the above described type and manner. In the example embodiment of the FIG. 3, the splines produced as a function of the support points by the means 25 are transferred to the APT processor 23, which transfers the corresponding spline data in the machine-independent control file 24 to the post-processors 26.

The post-processors 26 provide the splines in the machine-dependent control files 27 in polynomial format to the control arrangements 28. The control arrangements 28 control the motion of the tool along the tool paths on the basis of the corresponding splines. Through the provision of the splines in polynomial format it is ensured that the control arrangements 28 of the milling machine or NC machine can further process the splines without problems and can use the splines for the control of the milling tool.

With the aid of the inventive method as well as the inventive apparatus, the milling of freeform surfaces can be considerably improved. The data volume to be processed by the milling machine is considerably reduced. The splines ensure curve-continuous tool paths, whereby the surface quality of the freeform surfaces to be produced can be considerably improved. The milling machine is less strongly excited into vibrations, and therefore also the milling tools are subjected to a low wear.

The inventive apparatus as well as the inventive method are especially suitable for the milling machining of rotationally symmetrical gas turbine components with integral blading, that is to say so-called blisks (bladed disks) or blings (bladed rings).

The invention claimed is:

1. Method for milling a freeform surface on a workpiece using a milling machine, whereby the workpiece is milled by a tool of the milling machine such that a desired freeform surface is formed, and to carry out the milling the tool is moved relative to the workpiece along a tool path defined by splines whereby the motion of the tool is controlled based on the splines, characterized in that the splines are calculated as polynomials directly from control points stored in workpiece coordinates or in machine coordinates in a CAD/CAM system, and the tool path is generated from six splines if the control points are defined in workpiece coordinates, and is generated from five splines if the control points are defined in machine coordinates, whereby one independent spline is produced for each coordinate.

2. Method according to claim 1, characterized in that, for each tool path, the splines are calculated through the use of one or more interpolation parameters which are equal for all of the splines of the respective tool path, so that all of the splines of the respective tool path are synchronized with one another.

3. Apparatus for milling a freeform surface on a workpiece, whereby a tool is adapted to mill the workpiece in such a manner so that a desired freeform surface is formed, comprising a programming arrangement (21) for programming a tool path, and comprising at least one control arrangement (28) for controlling a motion of the tool relative to the workpiece along the tool path defined by splines, characterized in that the programming arrangement (21) is embodied as a CAD/CAM system, and further comprising means (25) allocated to the programming arrangement (21) and adapted to calculate the splines as polynomials directly from control points stored in workpiece coordinates or machine coordinates in the CAD/CAM system in such a manner so that the means (25) are adapted to generate the tool path from six splines if the control points are defined in workpiece coordinates, and from five splines if the control points are defined in machine coordinates, whereby an independent spline is produced for each coordinate, and wherein the CAD/CAM system is adapted to produce at least one APT file (22), and further comprising at least one downstream-connected post-processor (26) adapted to convert the at least one APT file into at least one control file (27) that is executable by the, or each control arrangement (28), and whereby the or each control arrangement (28) is adapted to control the motion of the tool along the tool path based on and in accordance with the splines.

4. Apparatus according to claim 3, further comprising an APT processor (23), characterized in that the means (25) allocated to the programming arrangement (21) are arranged and adapted to transfer the splines to the APT processor (23) which is arranged and adapted to transfer the splines to the or each post-processor (26), whereby the or each post-processor (26) is arranged and adapted to provide the splines to the or each control arrangement (28) in a polynomial format.

5. A method of milling a freeform surface on a workpiece using a miller tool, comprising the steps:
 a) defining tool path control points, each respectively in six workpiece coordinates or five machine coordinates, wherein said control points define points within tolerance limits along a contour of a nominal freeform surface that is to be a milled;
 b) generating a plurality of splines as polynomials directly dependent on and fitting said control points sufficiently closely to remain within said tolerance limits of said contour, wherein a respective independent one of said splines is respectively generated for each one of said workpiece coordinates or said machine coordinates of all of said control points, so that said plurality of splines includes a total of six splines respectively allocated to said six workpiece coordinates if said control points are defined in said six workpiece coordinates, and said plurality of splines includes a total of five splines respectively allocated to said five machine coordinates if said control points are defined in said five machine coordinates; and
 c) moving said miller tool in contact with and relative to said workpiece so that said miller tool mills said workpiece, and controlling said moving of said miller tool directly based on and in accordance with said plurality of splines as polynomials respectively allocated to said workpiece coordinates or said machine coordinates so that said miller tool moves along a tool path defined by said splines as Polynomials in said workpiece coordinates or said machine coordinates and thereby mills an actual freeform surface on said workpiece within said tolerance limits of said contour of said nominal freeform surface.

6. An apparatus for milling a freeform surface on a workpiece, comprising:
 a movable miller tool that is movable relative to the workpiece;
 plural control arrangements respectively adapted to control a motion of said miller tool respectively in six workpiece coordinates or in five machine coordinates;
 a programming arrangement programmed to define tool path control points in said six workpiece coordinates or in said five machine coordinates, wherein said control points define points within tolerance limits along a contour of a nominal freeform surface that is to be milled
 a processing arrangement that is interposed between said programming arrangement and said control arrangements, and that is adapted and programmed to generate a plurality of splines as polynomials directly dependent on and fitting said control points sufficiently closely to remain within said tolerance limits of said contour, wherein a respective independent one of said splines is respectively to be generated for each one of said workpiece coordinates or said machine coordinates of all of said control points, so that said plurality of splines includes a total of six splines respectively allocated to said six workpiece coordinates if said control points are defined in said six workpiece coordinates, and said plurality of splines includes a total of five splines respectively allocated to said five machine coordinates if said control points are defined in said five machine coordinates; and
 wherein said control arrangements are adapted to control the motion of said miller tool directly based on and in accordance with said plurality of splines as polynomials respectively allocated to said workpiece coordinates or said machine coordinates so that said miller tool is adapted to move along a tool path defined by said splines as polynomials in said workpiece coordinates or said machine coordinates and thereby to mill an actual freeform surface on said workpiece within said tolerance limits of said contour of said nominal freeform surface.

* * * * *

UNITED STATES PATENT AND TRADEMARK OFFICE
CERTIFICATE OF CORRECTION

PATENT NO. : 7,392,110 B2
APPLICATION NO. : 10/564209
DATED : June 24, 2008
INVENTOR(S) : Arndt Glaesser It is certified that error appears in the above-identified patent and that said Letters Patent is hereby corrected as shown below:

Column 1,
Line 59, after "invention" replace "dieclosed" by --disclosed--;

Column 5,
Line 22, after "the", delete ",";
Line 40, after "be", delete "a";

Column 6,
Line 8, after "as" replace "Polynomials" by --polynomials--;
Line 24, after "milled", insert --;--.

Signed and Sealed this

Tenth Day of November, 2009

David J. Kappos
*Director of the United States Patent and Trademark Office*